(12) United States Patent
Jiang et al.

(10) Patent No.: US 11,685,254 B2
(45) Date of Patent: Jun. 27, 2023

(54) INTERNAL SUPPORTING PART STRUCTURE FOR PLASTIC TANK

(71) Applicant: YAPP AUTOMOTIVE SYSTEMS CO., LTD, Yangzhou (CN)

(72) Inventors: Lin Jiang, Yangzhou (CN); Liang Liu, Yangzhou (CN); Hao Lv, Yangzhou (CN); Weidong Su, Yangzhou (CN); Anyu Wang, Yangzhou (CN); Gang Zhou, Yangzhou (CN); Yuewen He, Yangzhou (CN); Wenjuan Dou, Yangzhou (CN)

(73) Assignee: YAPP AUTOMOTIVE SYSTEMS CO., LTD., Yangzhou (CN)

( * ) Notice: Subject to any disclaimer, the term of this patent is extended or adjusted under 35 U.S.C. 154(b) by 176 days.

(21) Appl. No.: 17/419,758

(22) PCT Filed: Dec. 30, 2019

(86) PCT No.: PCT/CN2019/129908
§ 371 (c)(1),
(2) Date: Jun. 30, 2021

(87) PCT Pub. No.: WO2020/140866
PCT Pub. Date: Jul. 9, 2020

(65) Prior Publication Data
US 2022/0063398 A1 Mar. 3, 2022

(30) Foreign Application Priority Data

Dec. 31, 2018 (CN) .......................... 201811650098.X
Dec. 31, 2018 (CN) .......................... 201822263236.0

(51) Int. Cl.
*B60K 15/073* (2006.01)
*B60K 15/03* (2006.01)

(52) U.S. Cl.
CPC .... *B60K 15/03* (2013.01); *B60K 2015/03493* (2013.01)

(58) Field of Classification Search
CPC B60K 15/03; B60K 15/073; B60K 15/03177; B60K 2015/03039; B60K 2015/03493
(Continued)

(56) References Cited

U.S. PATENT DOCUMENTS

| 2018/0065475 A1 | 3/2018 | Amano et al. | |
| 2018/0194219 A1* | 7/2018 | Amano | ................... B60K 15/03 |
| 2020/0047607 A1* | 2/2020 | Gebert | ................... B60K 15/03 |

FOREIGN PATENT DOCUMENTS

| CN | 105539125 A | 5/2016 |
| CN | 206106927 U | 4/2017 |

(Continued)

*Primary Examiner* — Stephen J Castellano
(74) *Attorney, Agent, or Firm* — Bayramoglu Law Offices LLC

(57) ABSTRACT

An internal support part structure for a plastic tank includes a support rod and end surface components disposed at two ends of the support rod. The support rod is made of a first material. An outer surface of the end surface component is covered by a second material. An outer edge of the end surface component has a regular or irregular shape. The structure resolves a problem that a second material wrapping a first material and connected to an inner wall of a plastic tank may be easily pulled off the inner wall. When a fuel tank is impacted, the support rod of the structure breaks first, to protect the surface of the fuel tank from damage.

2 Claims, 3 Drawing Sheets

(58) Field of Classification Search
USPC .................................................. 220/653, 562
See application file for complete search history.

(56) References Cited

FOREIGN PATENT DOCUMENTS

| | | |
|---|---|---|
| CN | 107554285 A | 1/2018 |
| CN | 207156929 U | 3/2018 |
| CN | 109466847 A | 3/2019 |
| CN | 209757814 U | 12/2019 |
| DE | 102017001764 A1 | 8/2018 |

\* cited by examiner

INTERNAL SUPPORTING PART STRUCTURE FOR PLASTIC TANK

CROSS REFERENCE TO THE RELATED APPLICATIONS

This application is the national phase entry of International Application No. PCT/CN2019/129908, filed on Dec. 30, 2019, which is based upon and claims priority to Chinese Patent Applications No. 201811650098.X and No. 201822263236.0, both filed on Dec. 31, 2018, the entire contents of which are incorporated herein by reference.

TECHNICAL FIELD

The present invention relates to a support component, and specifically, to an internal support part structure for a plastic tank, and belongs to the field of fuel tank structural component technologies.

BACKGROUND

A support rod is used in a fuel tank to avoid that the fuel tank deforms under the action of unequal internal and external pressures and as a result the fuel tank ruptures to cause fuel leakage. After the support rod is added to the fuel tank, pressure resistance of the fuel tank is increased. However, during collision, impact, or a drop test of the fuel tank, the support rod causes damage to the surface of the fuel tank because the support rod is rigid. Therefore, the support rod needs to play a supporting role and also causes no damage to the fuel tank. When the support rod of this application is used, because a cross-sectional diameter of an end surface of the support rod is greater than a cross-sectional diameter of the support rod, during collision or an impact test of the fuel tank, the support rod breaks first. Therefore, the support rod is prevented from impacting the surface of the fuel tank to avoid damage to the surface of the fuel tank.

A conventional method for fixing an internal support part for a plastic tank is mainly to use a "first material" to manufacture a support rod inside the plastic tank, cover the support rod made of the "first material" with a "second material", and directly connect the "second material" to the plastic tank. A second fixing method adopts the same structure as the first method. To increase a pull-off force, the "first material" or the "second material" is a modified material, so that the "first material" and the "second material" may be connected together and then connected to an inner wall of the plastic tank, to increase the pull-off force. However, the two methods in the prior art are prone to the problem that the inner wall of the plastic tank may be easily pulled off. Therefore, a new solution is urgently needed to resolve the technical problem.

SUMMARY

The present invention is aimed at the technical problem existing in the prior art, and provides an internal support part structure for a plastic tank. The technical solution is ingeniously designed and compact in structure. This technical solution resolves the problem of easy pull-off when a second material covers a first material and is connected to an inner wall of a plastic tank. In addition, compared with the fixing method in which the pull-off force is increased after one of the materials is modified and the connecting surface undergoes physical and chemical changes, the technical solution has lower costs and is more convenient. During collision or an impact test of the fuel tank, the support rod breaks first, so that the support rod is prevented from impacting the surface of the fuel tank or damaging the surface of the fuel tank.

To achieve the foregoing objective, the present invention uses the following technical solution: an internal support part structure for a plastic tank is provided, where the structure includes a support rod and end surface components disposed at two ends of the support rod, the support rod is made of a first material, an outer surface of the end surface component is covered by a second material, an outer edge of the end surface component has a regular or irregular shape, and a ratio of a cross-sectional diameter at any position of the end surface component to a cross-sectional diameter at any position of the support rod is less than 1.8 and greater than 1.

As an improvement of the present invention, the outer edge of the end surface component is V-shaped, W-shaped, semicircular, arc-shaped, triangular, zigzag, or polygonal.

As an improvement of the present invention, the cross-sectional diameter of the end surface component is greater than the cross-sectional diameter of the support rod. The first material is a reinforced engineering plastic such as PPA, PPS, POM, or PA, or a metal material; and the second material is PE or HDPE.

Compared with the prior art, the present invention has the following advantages. The overall structural design of the technical solution is compact and ingenious. The structure described in the patent has the advantages of easy implementation, low costs, and adequate effects. Compared with the conventional connection methods using two materials, connection strength is higher, and the pull-off force is larger. The conventional methods may easily cause failure of later verification of the plastic tank. Compared with the material modification solution, the costs are lower, and it is not necessary to specially use a modified material to replace the first material or the second material for connection of the two materials. In addition, the second material is welded inside the body of the plastic tank, only the shape of a bottom surface of the body needs to be changed, and the pull-off force between the two materials can be increased by increasing the circumference of the surface.

In the figures: 1. support rod, 2. end surface component, 3. outer edge, 4. first material, and 5. second material.

DETAILED DESCRIPTION OF THE EMBODIMENTS

To deepen the understanding of the present invention, this embodiment is described in detail below with reference to the accompanying drawings.

Figure 1:
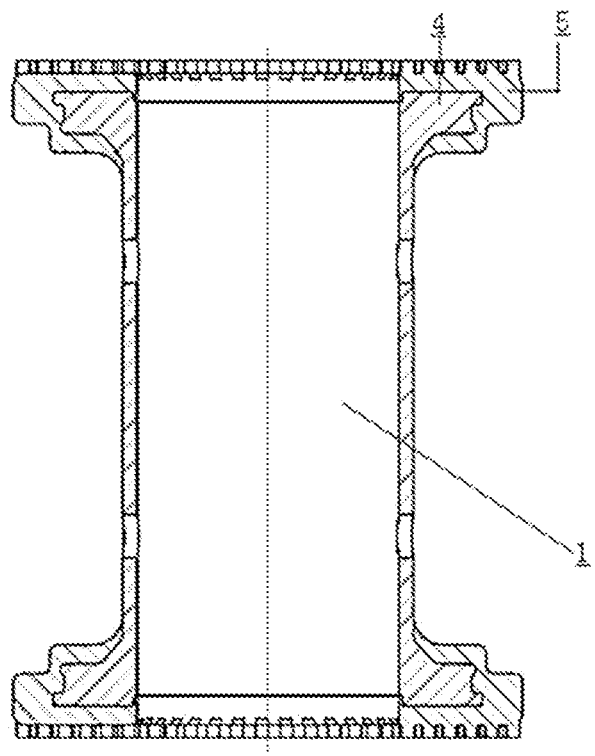
FIG. 1 is a side view of the present invention.
Figure 2:
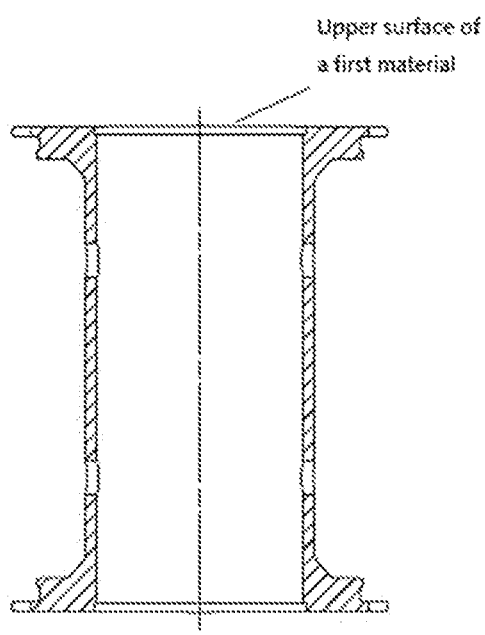
FIG. 2 is a side view of a support rod.
Figure 3:
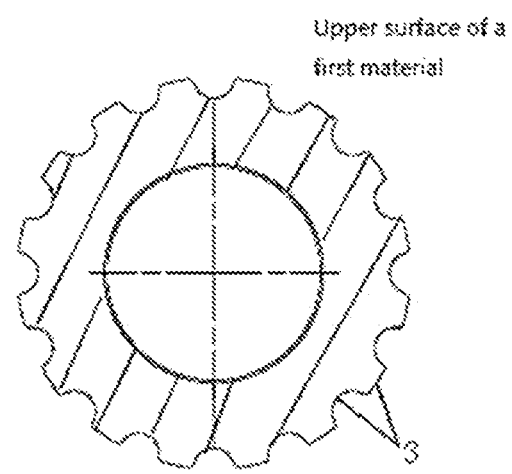
FIG. 3 is a schematic diagram of an upper surface of a first material.
Figure 4:
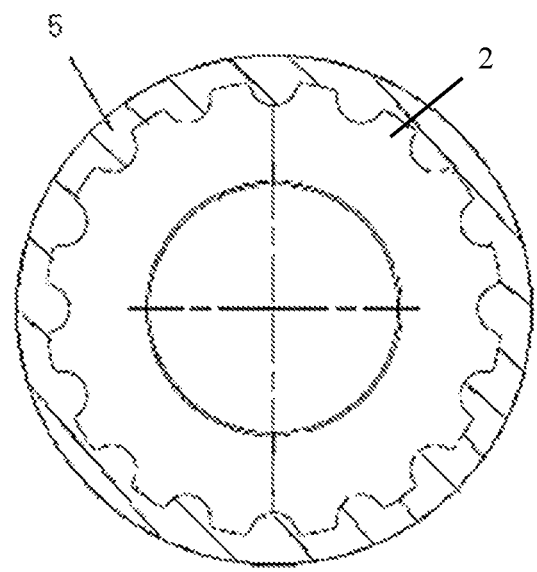
FIG. 4 is a top view of the present invention.
Figure 5A:
FIGS. 5A-5E show an outer edge of an end surface component.
Figure 5B:
Figure 5C:
Figure 5D:
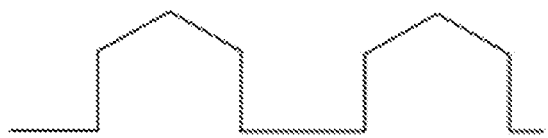
Figure 5E:
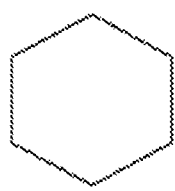

Embodiment 1: Referring to FIG. 1 and FIG. 2, an internal support part structure for a plastic tank is provided. The structure includes a support rod 1 and end surface components 2 disposed at two ends of the support rod. The support rod is made of a first material 4. An outer surface of the end surface component is covered by a second material 5. An outer edge of the end surface component has a regular or irregular shape. Referring to FIGS. 5A-5E, the outer edge 3 of the end surface component is V-shaped, W-shaped, semi-circular, arc-shaped, triangular, zigzag, or polygonal. The end surface of the support rod is covered with the second material, and the second material is the same as the material of a fuel tank. The first material is a reinforced engineering plastic such as PPA, PPS, POM, or PA, or a metal material; and the second material is PE or HDPE. The material of the support rod is the first material or the second material. The first material and the second material are the same or different. The support rod is hollow. A cross-sectional diameter of the end surface of the support rod is greater than a cross-sectional diameter of the support rod. A ratio of a maximum cross-sectional diameter at any position of the support rod to a cross-sectional diameter at any position of the support rod is less than 1.8 and greater than 1. In this solution, the discontinuity of the outer edge of the end surface is to increase a pull-off force between the first material and the second material, so that the support rod cannot be easily pulled off the surface of the fuel tank. A calculation formula of the pull-off force is: $F=C*A*P$, where C is a circumference of the outer edges of the upper and lower surfaces of the support rod, A is a cross-sectional area of a pull-off surface, and P is a shear strength of the second material. After the outer edges of the upper and lower surfaces of the support rod are designed into a shape such as "V" or "W", lengths of the outer edges of the upper and lower surfaces of the support rod are increased, so that the pull-off force $F'=C'*A*P$, and the pull-off force is increased. C' is the circumference of the outer edges of the upper and lower surfaces of the support rod in this application. Because C' is greater than C, F' is greater than F, and the pull-off force between the support rod and the surface of the fuel tank is increased. Before the fuel tank is put into mass production, the performance of the fuel tank needs to be tested. One of the important tests is an impact test of the fuel tank. In the impact test, the fuel tank is dropped from a height to check whether the fuel tank has a rupture or a fuel leakage. After a lot of tests, when a ratio of a maximum cross-sectional diameter of the end surface of the support rod to a minimum cross-sectional diameter of the support rod is 1.25, the fuel tank is protected from damage due to the rigid support rod when the fuel tank is impacted. However, it is not necessarily beneficial to maximize the ratio of the maximum cross-sectional diameter of the end surface of the support rod to the minimum cross-sectional diameter of the support rod. A larger diameter of the end surface of the support rod requires more materials and higher costs. Therefore, in consideration of the production costs and the effect that the support rod first breaks to avoid damage to the surface of the fuel tank when the fuel tank is impacted, a ratio of a cross-sectional diameter at any position of the end surface component to a cross-sectional diameter at any position of the support rod is less than 1.8 and greater than 1, and the support rod has larger diameters at two ends and a small diameter in the middle.

It should be noted that the above embodiments are not used to limit the protection scope of the present invention, and equivalent changes or substitutions made on the basis of the above technical solutions fall within the protection scope of the claims of the present invention.

What is claimed is:

1. An internal support part structure for a plastic tank, comprising:
    a support rod and end surface components; wherein
    the end surface components are disposed at two ends of the support rod and share a central axis with the support rod,
    the support rod is made of a first material,
    an outer surface of each end surface component of the end surface components is covered by a second material,
    an outer edge of the each end surface component has a regular shape or an irregular shape, and
    a ratio of a cross-sectional diameter at a position of the each end surface component to a cross-sectional diameter at a position of the support rod is less than 1.8 and greater than 1, wherein the cross-sectional diameters are perpendicular to the central axis,
    wherein the outer edge of the each end surface component comprises a plurality of indentations that are V-shaped, W-shaped, semicircular, arc-shaped, zigzag, or multi-sided when viewed in a cross-sectional plane that is perpendicular to the central axis, wherein the indentations are indented toward the central axis in the plane wherein at least one of the indentations is filled with said second material.

2. The internal support part structure according to claim 1, wherein
    the first material is a reinforced engineering plastic comprising polyphthalamide (PPA), polyphenylene sulfide (PPS), polyoxymethylene (POM), or polyamide (PA), or the first material is a metal material; and
    the second material is polyethylene (PE) or high-density PE (HDPE).

* * * * *